US012771771B2

(12) United States Patent
Jiang et al.

(10) Patent No.: US 12,771,771 B2
(45) Date of Patent: Oct. 20, 2026

(54) ELECTRONIC DEVICE

(71) Applicant: VIVO MOBILE COMMUNICATION CO., LTD., Guangdong (CN)

(72) Inventors: Guozhu Jiang, Guangdong (CN); Fengliang Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 274 days.

(21) Appl. No.: 18/618,637

(22) Filed: Mar. 27, 2024

(65) Prior Publication Data

US 2024/0244129 A1 Jul. 18, 2024

Related U.S. Application Data

(63) Continuation of application No. PCT/CN2022/120576, filed on Sep. 22, 2022.

(30) Foreign Application Priority Data

Sep. 28, 2021 (CN) .......................... 202111141163.8

(51) Int. Cl.
*H04R 1/02* (2006.01)
*H04M 1/03* (2006.01)
*H04R 1/08* (2006.01)

(52) U.S. Cl.
CPC ............ *H04M 1/035* (2013.01); *H04R 1/086* (2013.01)

(58) Field of Classification Search
None
See application file for complete search history.

(56) References Cited

U.S. PATENT DOCUMENTS 5,802,198 A 9/1998 Beavers et al.
6,337,908 B1 * 1/2002 Andersen .............. H04M 1/035 379/433.02
8,811,645 B2 * 8/2014 Inoda ....................... H04R 1/32 381/357

(Continued)

FOREIGN PATENT DOCUMENTS

CA 2728577 A1 7/2012
CN 102638597 A 8/2012

(Continued)

OTHER PUBLICATIONS

First Office Action for Chinese Application No. 202111141163.8, dated Aug. 29, 2023, 9 Pages.

(Continued)

*Primary Examiner* — Tuan A Tran
(74) *Attorney, Agent, or Firm* — BROOKS KUSHMAN P.C.

(57) ABSTRACT

An electronic device. The electronic device includes: a housing, where a sound intake hole is provided on the housing, and the housing includes an inner cavity; and a microphone and a balance valve are arranged inside the housing. The microphone is in communication with the sound intake hole through a first sound guide channel, the balance valve is in communication with the sound intake hole through a second sound guide channel, and the balance valve is located at a junction of the inner cavity and the second sound guide channel; and the first sound guide channel is in communication with the second sound guide channel.

9 Claims, 2 Drawing Sheets

(56) References Cited

U.S. PATENT DOCUMENTS

| | | | | |
|---|---|---|---|---|
| 8,824,719 | B2 * | 9/2014 | Tanaka | H04R 19/04<br>381/369 |
| 8,861,764 | B2 * | 10/2014 | Tanaka | H04R 1/38<br>381/357 |
| 8,865,499 | B2 * | 10/2014 | Pahl | B81B 7/0061<br>257/416 |
| 9,078,063 | B2 * | 7/2015 | Loeppert | H04R 1/08 |
| 9,185,480 | B2 * | 11/2015 | Howes | H04R 1/086 |
| 9,253,297 | B2 * | 2/2016 | Abe | H04M 1/03 |
| 9,843,659 | B2 * | 12/2017 | Yamaguchi | H04M 1/035 |
| 10,215,742 | B2 * | 2/2019 | Choi | G01N 33/0004 |
| 10,405,105 | B2 * | 9/2019 | Kursula | H04R 19/04 |
| 11,778,367 | B2 * | 10/2023 | Ilkorur | H04R 1/2811<br>381/150 |
| 11,818,526 | B2 * | 11/2023 | Park | H04M 1/026 |
| 11,943,378 | B2 * | 3/2024 | Jung | H04N 23/52 |
| 2020/0045151 | A1 | 2/2020 | Ren | |
| 2020/0329289 | A1 | 10/2020 | Kenaley et al. | |
| 2021/0120114 | A1 | 4/2021 | Li et al. | |

FOREIGN PATENT DOCUMENTS

| | | | |
|---|---|---|---|
| CN | 106792299 | A | 5/2017 |
| CN | 206294215 | U | 6/2017 |
| CN | 108632419 | A | 10/2018 |
| CN | 109348320 | A | 2/2019 |
| CN | 208548931 | U | 2/2019 |
| CN | 110365820 | A | 10/2019 |
| CN | 110519423 | A | 11/2019 |
| CN | 209627421 | U | 11/2019 |
| CN | 110536194 | A | 12/2019 |
| CN | 209994417 | U | 1/2020 |
| CN | 111343317 | A | 6/2020 |
| CN | 111510539 | A | 8/2020 |
| CN | 211266908 | U | 8/2020 |
| CN | 211860197 | U | 11/2020 |
| CN | 212163404 | U | 12/2020 |
| CN | 112369045 | A | 2/2021 |
| CN | 212812233 | U | 3/2021 |
| CN | 214154576 | U | 9/2021 |
| CN | 113840025 | A | 12/2021 |
| DE | 102010029936 | A1 | 12/2011 |
| JP | 2001230841 | A | 8/2001 |
| JP | 2008199225 | A | 8/2008 |
| KR | 102201583 | B1 | 1/2021 |

OTHER PUBLICATIONS

Second Office Action for Chinese Application No. 202111141163.8, dated Mar. 29, 2024, 8 Pages.

International Search Report and Written Opinion for Application No. PCT/CN2022/120576, dated Nov. 28, 2022, 8 Pages.

* cited by examiner

ELECTRONIC DEVICE

CROSS-REFERENCE TO RELATED APPLICATIONS

This application is a continuation of International Application No. PCT/CN2022/120576 filed on Sep. 22, 2022, which claims priority to Chinese Patent Application No. 202111141163.8 filed on Sep. 28, 2021, which are incorporated herein by reference in their entireties.

TECHNICAL FIELD

This application relates to the technical field of electronic devices, and specifically, to an electronic device.

BACKGROUND

With the continuous development of communication technologies, mobile smart hardware such as a mobile phone has become an important carrier of human-machine interaction, which not only meets functional requirements such as normal communication and entertainment, but also meets a requirement of a user on fashionable appearance of the mobile smart hardware. Therefore, the mobile smart hardware such as the mobile phone not only needs to carry a plurality of devices and a plurality of functions, but also needs to meet lightening and thinning and concise appearance.

However, at present, holes need to be provided for a speaker, a phone receiver, a microphone, and the like of the mobile smart hardware such as the mobile phone, and a large quantity of holes need to be provided, which affects product appearance and user experience. An existing appearance improvement solution is mainly to hide the provided holes through micro gaps, however, this solution generally may increase a reliability risk that the holes are blocked by dust.

As can be known from the above, a problem that providing holes on an electronic device affects user experience exists in the related art.

SUMMARY

An objective of embodiments of this application is to provide an electronic device.

According to a first aspect, an embodiment of this application provides an electronic device. The electronic device includes:

- a housing, where a sound intake hole is provided on the housing, and the housing includes an inner cavity; and a microphone and a balance valve are arranged inside the housing, where
- the microphone is in communication with the sound intake hole through a first sound guide channel, the balance valve is in communication with the sound intake hole through a second sound guide channel, and the balance valve is located at a junction of the inner cavity and the second sound guide channel; and the first sound guide channel is in communication with the second sound guide channel.

DETAILED DESCRIPTION

The following clearly describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of this application fall within the protection scope of this application.

In the specification and claims of this application, the terms "first", "second", and the like are used to distinguish between similar objects rather than describe a specific sequence or order. It should be understood that data termed in such a way is interchangeable in proper circumstances, so that the embodiments of this application can be implemented in sequences other than the sequence illustrated or described herein. In addition, the objects distinguished by "first", "second", and the like generally belong to a same type, and a quantity of the objects is not limited. For example, there may be one first object or may be a plurality of first objects. In addition, in the specification and the claims, "and/or" indicates at least one of connected objects, and the character "/" generally indicates an "or" relationship between associated objects.

An electronic device provided in the embodiments of this application is described in detail below through specific embodiments and application scenarios thereof with reference to the accompanying drawings.

Figure 1:
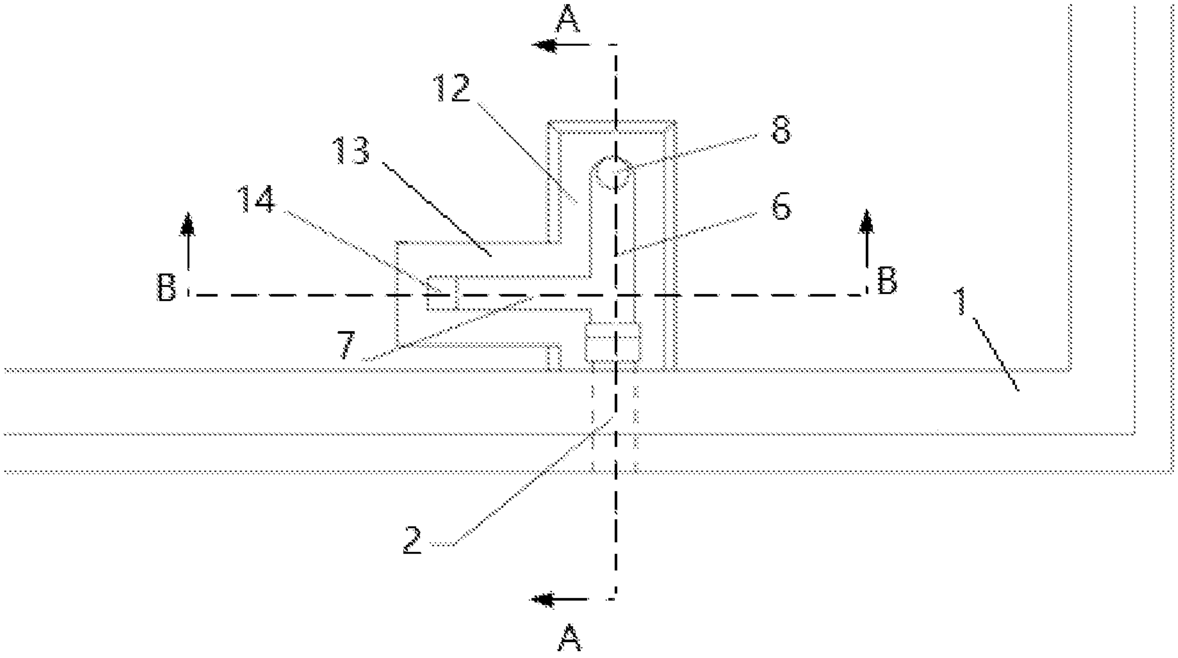
FIG. 1 a schematic structural diagram of an electronic device according to an embodiment of this application.
Figure 2:
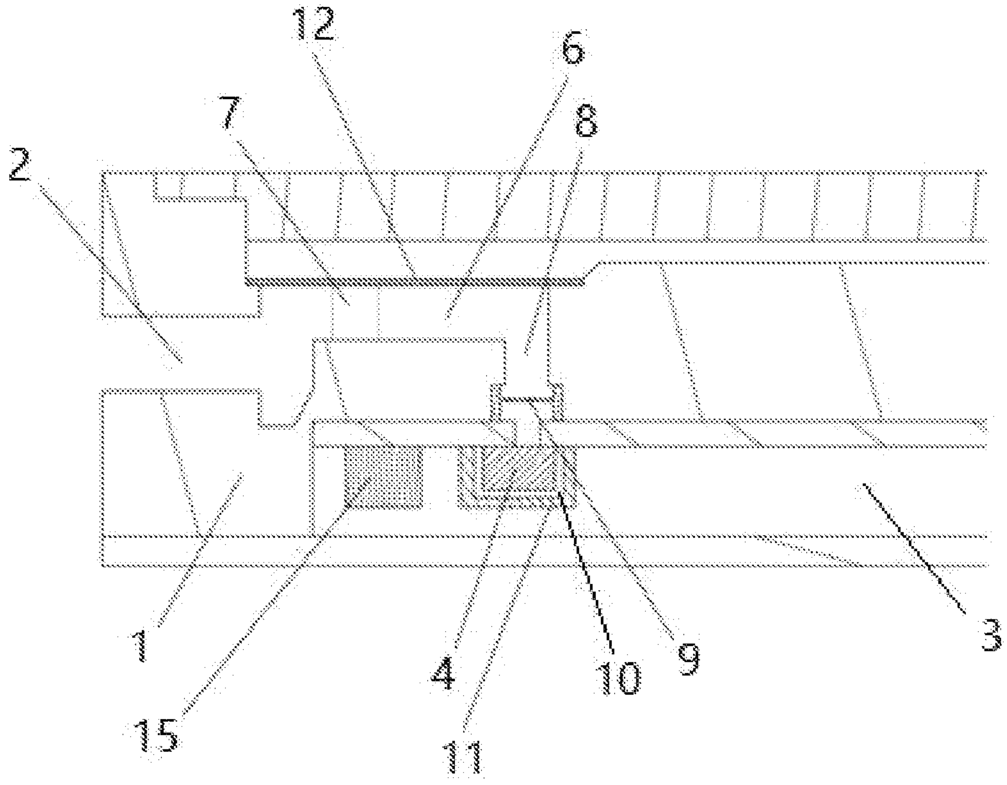
FIG. 2 is a schematic cross-sectional view along a direction A-A of FIG. 1.
Figure 3:
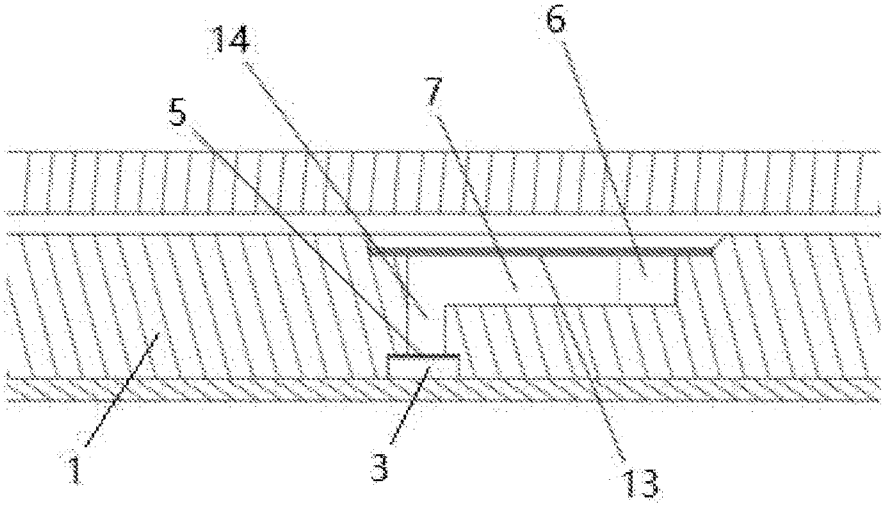
FIG. 3 is a schematic cross-sectional view along a direction B-B of FIG. 1.

As shown in FIG. 1 to FIG. 3, the electronic device provided in the embodiments of this application includes:

- a housing 1, where a sound intake hole 2 is provided on the housing 1, and the housing 1 includes an inner cavity 3; and a microphone 4 and a balance valve 5 are arranged inside the housing 1, where
- the microphone 4 is in communication with the sound intake hole 2 through a first sound guide channel 6, the balance valve 5 is in communication with the sound intake hole 2 through a second sound guide channel 7, and the balance valve 5 is located at a junction of the inner cavity 3 and the second sound guide channel 7; and the first sound guide channel 6 is in communication with the second sound guide channel 7.

The balance valve is a component playing an air pressure balancing function on the inside (corresponding to the inner cavity) of the whole machine, and the balance valve may be formed by a waterproof and air-permeable material. Inner cavities 3 marked in FIG. 2 and FIG. 3 are essentially consistent, the inner cavities directly seen in the figures are merely parts of the inner cavity, and the part that can be directly seen in FIG. 2 is in communication with the part that can be directly seen in FIG. 3.

In the embodiments of this application, the electronic device includes a housing 1, where a sound intake hole 2 is provided on the housing 1, and the housing 1 includes an inner cavity 3; and a microphone 4 and a balance valve 5 are arranged inside the housing 1, where the microphone 4 is in communication with the sound intake hole 2 through a first sound guide channel 6, the balance valve 5 is in communication with the sound intake hole 2 through a second sound guide channel 7, and the balance valve 5 is located at a junction of the inner cavity 3 and the second sound guide channel 7; and the first sound guide channel 6 is in communication with the second sound guide channel 7. In this way, a branch can be provided in the sound guide channel of the microphone 4 and connected to the balance valve 5 playing an air pressure balancing function on the inside of the whole machine, so that the sound intake hole 2 of the microphone 4 is in communication with the microphone 4 and the balance valve 5 simultaneously, and one appearance hole is reduced. Further, a reliability risk during use by a user is not increased while appearance gains are ensured, and occurrence of a reliability problem that holes are blocked by dust is prevented, thereby ensuring user experience.

As shown in FIG. 1 and FIG. 2, the microphone 4 is in communication with the first sound guide channel 6 through a microphone inner hole 8, and a dustproof component 9 is arranged inside the microphone inner hole 8.

In this way, the environment cleanliness of the microphone can be ensured as much as possible. Specifically, the dustproof component may be a dustproof mesh or a waterproof and air-permeable film.

As shown in FIG. 2, a placement groove 10 in communication with the microphone inner hole 8 is further provided on the housing 1, and the microphone 4 is placed in the placement groove 10.

In this way, mounting and fixing of the microphone can be facilitated.

As shown in FIG. 2, a shielding component 11 is arranged along a side wall inside the placement groove 10.

In this way, the microphone can be prevented from collecting noise as much as possible. Specifically, the shielding component 11 may be a silicone pad. The placement groove 10, the microphone 4, and the shielding component 11 may all be provided on a motherboard or a motherboard upper cover. However, this application is not limited thereto.

As shown in FIG. 2, the shielding component 11 covers the whole placement groove 10, and a shape of the shielding component 11 is consistent with a shape of the placement groove 10.

In this way, the microphone can be prevented from collecting noise to the greatest extent.

As shown in FIG. 1 to FIG. 3, a first sealing component 12 is arranged on a side wall of the first sound guide channel 6 that is close to the second sound guide channel 7; and/or a second sealing component 13 is arranged on a side wall of the second sound guide channel 7 that is away from the sound intake hole 2.

In this way, a closed channel can be formed as much as possible, to ensure accurate sound receiving of the microphone. The first sealing component and the second sealing component may respectively be polyethylene glycol terephthalate (PET) or formed by a material having same functions.

As shown in FIG. 1, the first sealing component 12 and the second sealing component 13 are an integrally formed member, or the first sealing component 12 and the second sealing component 13 are smoothly connected. It may be understood as that, the first sealing component 12 arranged on the side wall of the first sound guide channel 6 is connected to the second sealing component 13 arranged on the side wall of the second sound guide channel 7.

In this way, formation of a complete closed surface inside the sound guide channel can be ensured as much as possible, and a sound receiving effect of the microphone is further improved, thereby better implementing sound receiving.

As shown in FIG. 1, the first sound guide channel 6 and the second sound guide channel 7 form a fork shape, and an angle exists between a central axis of the first sound guide channel 6 and a central axis of the second sound guide channel 7.

In this way, the balance valve and the microphone can be prevented from being arranged in a same channel. Specifically, the angle is greater than 0 degree and may be 90 degrees. In this way, it can be ensured that the first sound guide channel to the microphone and the second sound guide channel to the balance valve are set as independent channels.

As shown in FIG. 1 and FIG. 3, the balance valve 5 is in communication with the second sound guide channel 7 through a balance valve inner hole 14, and the balance valve 5 is located on an end of the balance valve inner hole 14 that is close to the inside of the electronic device.

In this way, a sound wave inside the whole machine can be blocked as much as possible, thereby preventing crosstalk of sound inside the whole machine into the microphone.

In the embodiments of this application, a cross-sectional area of the balance valve is greater than or equal to 0.5 $mm^2$ and less than or equal to 10 $mm^2$.

In this way, the acoustic performance of the microphone can be improved as much as possible, and good flatness can be obtained, thereby implementing an application requirement of wideband recording.

The following describes the electronic device provided in the embodiments of this application through examples.

For the foregoing technical problem, an embodiment of this application provides an electronic device, which mainly provides a branch in the sound guide channel of the microphone to be connected to the balance valve playing an air pressure balancing function on the inside of the whole machine, to cause the sound intake hole of the microphone to be in communication with the microphone and the balance valve simultaneously, thereby reducing one appearance hole. Further, based on this, a port diameter (corresponding to the cross-sectional area of the balance valve) of a balance valve port may be controlled, to optimize the acoustic performance of the microphone. Specifically, for example, the balance valve port may be sealed by using a waterproof and air-permeable film, and the port diameter of the balance valve port is then controlled properly, to improve the acoustic performance of the microphone and obtain good flatness, thereby implementing an application requirement of wideband recording.

The following specifically describes the solution provided in the embodiments of this application through examples.

As shown in FIG. 1 to FIG. 3, a sound intake channel of the microphone in this solution includes: the sound intake hole 2 formed on a middle frame (corresponding to the housing 1), a sound guide channel one (corresponding to the first sound guide channel 6), the microphone inner hole 8, a sound guide channel two (corresponding to the second sound guide channel 7), the balance valve inner hole 14, and structures such as a microphone waterproof and air-permeable film (corresponding to a specific implementation of the dustproof component 9), a microphone silicone pad (corresponding to a specific implementation of the shielding component 11), the microphone 4, and the balance valve 5 that are located below the microphone inner hole 8. The balance valve 5 may specifically be formed by a waterproof and air-permeable film adhered to the balance valve port (corresponding to the end of the balance valve inner hole 14 that is close to the inside of the electronic device on which the balance valve 5 is located). Specifically, sound is transmitted from the sound guide channel one and the microphone inner hole 8 to the microphone 4, which is a main sound intake path; and the branch sound guide channel two is connected to the sound guide channel one, and the other end is in communication with the balance valve inner hole 14 and the balance valve 5. This solution may replace the solution of providing holes for the microphone and the balance valve respectively, and two holes are reduced to one hole. Specifically, the sound guide channel two is added, so that the sound intake channel of the microphone is in communication with the balance valve inner hole, and an independent appearance hole for the balance valve is canceled.

A cross section of the main sound intake channel may be shown in FIG. 2, and the sound runs from the microphone inner hole 8 connected to the sound guide channel one and reaches the microphone 4 through the microphone waterproof and air-permeable film. As shown in FIG. 3, the sound guide channel two serving as a branch channel is connected to the sound guide channel one and leads to the balance valve 5 in another direction. Specifically, PET or a material having same functions may be provided above the sound intake channel for sealing to form a closed channel, and the microphone waterproof and air-permeable film may play waterproof and air-permeable functions. In addition, due to a design of a 5G antenna, an antenna spring 15 and a shielding cover (corresponding to the shielding component 11) may result in a long length of the sound guide channel, and when the sound guide channel is excessively long, a bandwidth may be insufficient. This problem may be effectively alleviated through a branch channel formed by the sound guide channel two and the balance valve 5 described in this solution, and for details, reference may be made to the following content.

Specifically, a cross section of the branch channel may be shown in FIG. 3, air and a sound wave may reach the balance valve 5 through the sound guide channel two, and the balance valve 5 may be formed by a waterproof and air-permeable material, where one end of the balance valve is connected to the balance valve inner hole 14, and the other end (that is, a lower end surface of the balance valve 5) is in communication with the inside (corresponding to the inner cavity 3) of the whole machine. The waterproof and air-permeable film of the balance valve 5 has large acoustic impedance, so that the sound wave inside the whole machine may be blocked to some extent, that is, the sound wave may be reduced by 10 dB to 20 dB, and even more than 20 dB, which may basically prevent crosstalk of sound inside the whole machine into the microphone. In addition, the branch channel formed by the sound guide channel two and the balance valve 5 may affect the acoustic performance of the microphone. In this solution, a size of the balance valve may be adjusted properly, and a recommended value for an area of the balance valve (corresponding to the cross-sectional area) is greater than or equal to 0.5 $mm^2$ and less than or equal to 10 $mm^2$, thereby preventing influence on a frequency response of a middle frequency of the microphone. For detailed analysis, reference may be made to the following description.

Figure 4:
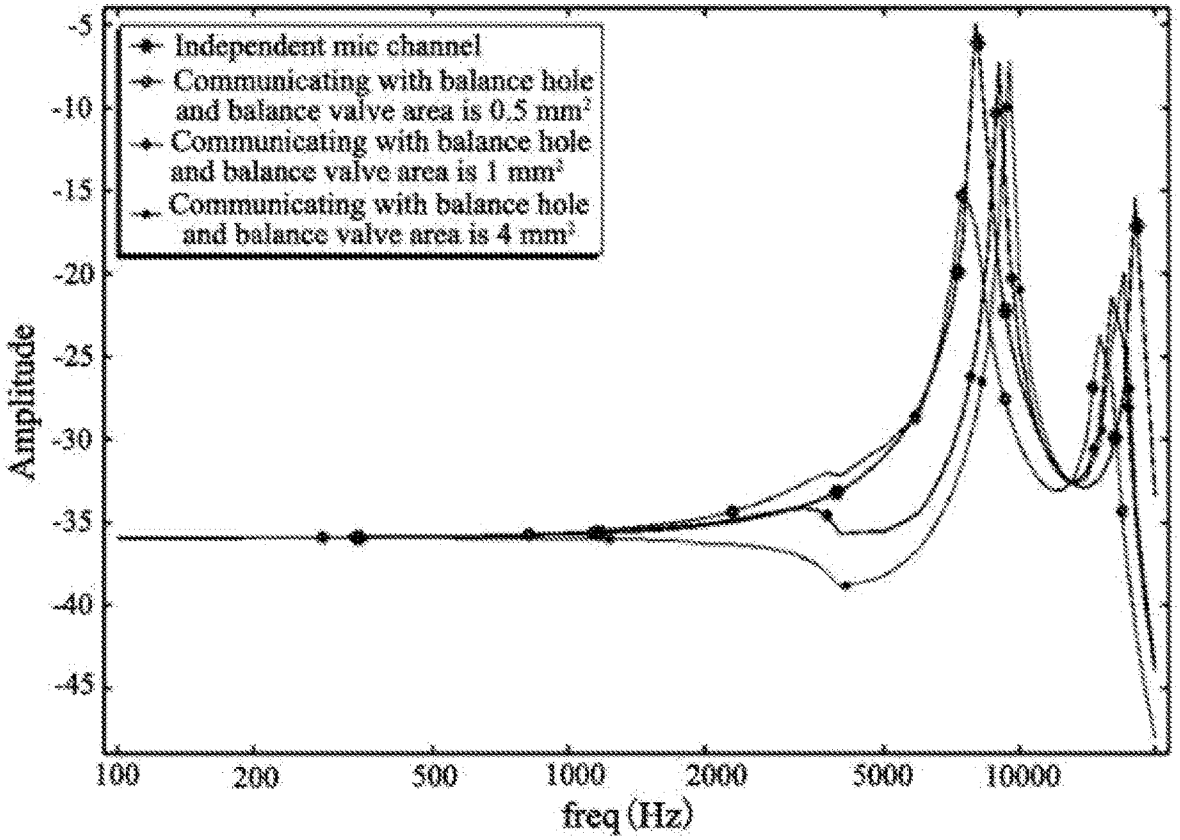
FIG. 4 is a schematic diagram of frequency response curves of a microphone according to an embodiment of this application.

In this solution, microphone frequency response curves under three exemplary balance valve sizes and an independent microphone sound intake channel are analyzed through simulation, and simulation results may be shown in FIG. 4 (a horizontal coordinate is a frequency and a unit is Hz; and a vertical coordinate is an amplitude (frequency response) and a unit is dB). In marks at an upper left corner of FIG. 4, a curve corresponding to the first mark is a microphone frequency response curve of an independent microphone sound intake channel (that is, not being in communication with the balance valve inner hole), a curve corresponding to the second mark is a microphone frequency response curve when being in communication with a balance hole (that is, the balance valve inner hole) (that is, the first sound guide channel and the second sound guide channel are both in communication with the sound intake hole) and the area of the balance valve is 0.5 $mm^2$, a curve corresponding to the third mark is a microphone frequency response curve when being in communication with a balance hole (that is, the first sound guide channel and the second sound guide channel are both in communication with the sound intake hole) and the area of the balance valve is 1 $mm^2$, and a curve corresponding to the fourth mark is a microphone frequency response curve when being in communication with a balance hole (that is, the first sound guide channel and the second sound guide channel are both in communication with the sound intake hole) and the area of the balance valve is 4 $mm^2$. It may be inferred from the figure that: when the area of the balance valve is less than 0.5 $mm^2$, the bandwidth is greatly affected; when the area of the balance valve is far greater than 4 $mm^2$, a frequency response from 3 kHz to 6 kHz is deeply recessed; and when the area of the balance valve ranges from 1 $mm^2$ to 4 $mm^2$, the bandwidth is improved, the middle frequency is flat, and the performance of the microphone may be well improved. Based on this, in consideration of the whole, it is acceptable when the cross-sectional area of the balance valve is greater than or equal to 0.5 $mm^2$ and less than or equal to 10 $mm^2$.

As can be known from the above, in the solution provided in this application, a branch can be provided in the sound guide channel of the microphone, so that the balance valve and the microphone share one sound intake hole, and one appearance hole is reduced. In addition, the size of the balance valve is controlled properly, so that the frequency response and middle frequency flatness of the microphone may be improved, and the performance of wideband application may be improved.

It is noted herein that, in this solution, the microphone waterproof and air-permeable film may be replaced with a common dustproof mesh, and same effects may also be achieved.

It should be noted that, the term “include”, “comprise”, or any other variation thereof in this specification is intended to cover a non-exclusive inclusion. Therefore, a process, method, object, or apparatus that includes a series of elements not only includes such elements, but also includes other elements that are not expressly listed, or may include elements inherent to the process, method, object, or apparatus. Without more limitations, elements defined by the sentence “include a/an . . . ” does not exclude that there are still other same elements in the process, method, object, or apparatus that includes the element. In addition, features described with reference to some examples may also be combined in other examples.

The embodiments of this application are described above with reference to the accompanying drawings. However, this application is not limited to the foregoing specific implementations. The foregoing specific implementations are merely illustrative instead of limitative. Enlightened by this application, a person of ordinary skill in the art can make many forms without departing from the idea of this application and the protection scope of the claims, and all of the forms fall within the protection of this application.

The invention claimed is:

1. An electronic device, comprising:

a housing, wherein a sound intake hole is provided on the housing, and the housing comprises an inner cavity; and a microphone and a balance valve are arranged inside the housing, wherein the microphone is in communication with the sound intake hole through a first sound guide channel, the balance valve is in communication with the sound intake hole through a second sound guide channel, and the balance valve is located at a junction of the inner cavity and the second sound guide channel; and the first sound guide channel is in communication with the second sound guide channel;

the balance valve is made of a waterproof and air-permeable material;

wherein a first sealing component is arranged on a side wall of the first sound guide channel that is close to the second sound guide channel; and/or a second sealing component is arranged on a side wall of the second sound guide channel that is away from the sound intake hole.

2. The electronic device according to claim 1, wherein the microphone is in communication with the first sound guide channel through a microphone inner hole, and a dustproof component is arranged inside the microphone inner hole.

3. The electronic device according to claim 1, wherein a placement groove in communication with the microphone inner hole is further provided on the housing, and the microphone is placed in the placement groove.

4. The electronic device according to claim 3, wherein a shielding component is arranged along a side wall inside the placement groove.

5. The electronic device according to claim 4, wherein the shielding component covers the whole placement groove, and a shape of the shielding component is consistent with a shape of the placement groove.

6. The electronic device according to claim 1, wherein the first sealing component and the second sealing component are an integrally formed member, or the first sealing component and the second sealing component are smoothly connected.

7. The electronic device according to claim 1, wherein the first sound guide channel and the second sound guide channel form a fork shape, and an angle exists between a central axis of the first sound guide channel and a central axis of the second sound guide channel.

8. The electronic device according to claim 1, wherein the balance valve is in communication with the second sound guide channel through a balance valve inner hole, and the balance valve is located on an end of the balance valve inner hole that is close to the inside of the electronic device.

9. The electronic device according to claim 1, wherein a cross-sectional area of the balance valve is greater than or equal to 0.5 $mm^2$ and less than or equal to 10 $mm^2$.

* * * * *